(12) United States Patent
Vila Noria

(10) Patent No.: US 10,525,634 B2
(45) Date of Patent: Jan. 7, 2020

(54) ULTRASONIC WELDING DEVICE

(71) Applicant: Carles Vila Noria, Barcelona (ES)

(72) Inventor: Carles Vila Noria, Barcelona (ES)

( * ) Notice: Subject to any disclaimer, the term of this patent is extended or adjusted under 35 U.S.C. 154(b) by 0 days.

(21) Appl. No.: 16/317,577

(22) PCT Filed: Jul. 6, 2017

(86) PCT No.: PCT/ES2017/070491
§ 371 (c)(1),
(2) Date: Jan. 14, 2019

(87) PCT Pub. No.: WO2018/011446
PCT Pub. Date: Jan. 18, 2018

(65) Prior Publication Data
US 2019/0275748 A1    Sep. 12, 2019

(30) Foreign Application Priority Data

Jul. 14, 2016 (ES) .................................. 201630962

(51) Int. Cl.
| | | |
|---|---|---|
| *B32B 37/00* | (2006.01) | |
| *B29C 65/00* | (2006.01) | |
| *B29C 65/08* | (2006.01) | |

(52) U.S. Cl.
CPC ........ *B29C 66/81812* (2013.01); *B29C 65/08* (2013.01)

(58) Field of Classification Search
CPC . B29C 65/08; B29C 66/81812; B65B 51/225; B06B 3/00
USPC ....................................................... 156/580.1
See application file for complete search history.

(56) References Cited

U.S. PATENT DOCUMENTS

| | | | | |
|---|---|---|---|---|
| 3,529,660 A | * | 9/1970 | Obeda .................. | B23K 20/106 165/47 |
| 3,607,580 A | * | 9/1971 | Obeda ..................... | B29C 65/08 156/580.1 |
| 4,426,244 A | * | 1/1984 | Wang ..................... | D04H 1/555 156/498 |
| 2010/0147466 A1 | * | 6/2010 | Sans Marimon ....... | B29C 65/08 156/580.2 |

* cited by examiner

*Primary Examiner* — James D Sells
(74) *Attorney, Agent, or Firm* — Mark M. Friedman

(57) ABSTRACT

The invention relates to an ultrasonic welding device comprising a sonotrode (1) secured to an amplifier (12), and this in turn being secured to a converter (13), on which the head (2) is secured, characterised by comprising an external casing (3) disposed around the sonotrode (1), together delimiting an annular chamber (4) for the circulation of pressurised air having a crenellated opening in the front end (31) thereof for the output of pressurised air and the cooling of the sonotrode (1), wherein said external casing (3) has a rear portion (32) on the head (2) that can move axially, forming a presser plate which exerts a pressure—owing to the action of compressible means (51)—against the parts (P1, P2) to be welded, in a peripheral zone next to the welding zone, before the tip (11) of the sonotrode (1) comes into contact with said parts to be welded.

5 Claims, 2 Drawing Sheets ized air
ULTRASONIC WELDING DEVICE

OBJECT OF THE INVENTION

The object of the present invention is an ultrasonic welding device, particularly for the welding of plastic parts. The device is comprised of a sonotrode, a booster and a converter, suitable for attachment to a handler, actuator or robotic arm that moves it to the welding spot to proceed with the welding operation, and to which a holding and cooling down head is attached.

A main aspect of the invention is to provide the device with the proper means to apply frontal pressure to the parts to be welded, in a peripheral zone very close to the welding spot, in order to eliminate the unwanted gap between the parts; and to effectively cool down the sonotrode and the weld once it is formed.

FIELD OF APPLICATION OF THE INVENTION

This invention is applicable in the welding of plastics by ultrasound.

STATE OF THE ART

In several sectors, such as the automotive sector, ultrasound is commonly used to weld plastics; one of the pieces to be joined has a set of bores, and studs are defined on the second part which pass through these bores. Both parts to be welded are overlapped prior to being welded. During the welding operation, a sonotrode moves in the axial direction against the hollow plastic stud, causing the plastic to melt and compress, forming a stud head or rivet on the first part which prevents the release of either part.

Cassette machines equipped with several spot welding sonotrodes are used to perform multiple welds simultaneously, providing a repetitive configuration.

Changing the parts to be welded requires a model change and the reconfiguration of the machine for each model.

More flexible ultrasonic welding devices are also known, with robotic arms, which allow the model to be changed by only modifying the coordinates.

During the use of these welding devices two problems usually arise:
 a first problem related to the proper cooling of sonotrode and the weld, for their efficiency and;
 a second problem related to the correct positioning of the parts to joined, so that an unwanted gap is not left between them.

Related to the first problem, sonotrode cooling, there are several antecedents:

In U.S. Pat. No. 3,438,428 a method is described for maintaining a vibratory tool at a controlled temperature. For its implementation, such a vibrating tool is applied to the plastic welding by means of a sonotrode. In order to carry out the aforementioned temperature control, a conduit is defined in the sonotrode to which the inlet and outlet of the external circulation circuit of a cooling fluid are connected.

U.S. Pat. No. 6,691,909 refers to a device and a method for working parts in ultrasonic welding which reduces sonotrode adhesion during the ultrasonic welding process. Document U.S. Pat. No. 6,691,909 also proposes an internal cooling system for the sonotrode, similar to that proposed in U.S. Pat. No. 3,438,428.

Document EP1000732 describes a device for the ultrasonic welding of elements for resin fixing, and proposes forming a passage for the air defined across a portion of the sonotrode, one of whose uses is to inject air in order to cool down the welded area.

These antecedents have some disadvantages: the projection of air through an internal conduit of the sonotrode can cause the appearance of bubbles or filaments in the melted material and consequently defective welds; furthermore, this projection is not especially effective since the advance of the sonotrode on the molten material plugs the inner bore with molten plastic, preventing air circulation inside the sonotrode and its exit at the tip or the front end, and excessively increasing the temperature of the sonotrode.

In relation to the second problem of positioning of the parts to be welded, the use of external handlers, separate from the welding device, which hold the parts in a zone more or less distant from the welding area is also known.

This often causes, especially in cases in which there is a material between the parts to be welded (e.g. a lining), the two parts to not be sufficiently held together in the welding zone, so that the pieces do not stay together but have an unwanted gap or groove between them, which in some cases this is unacceptable to the manufacturer.

The applicant is not aware of the existence of antecedents regarding ultrasonic welding devices that could satisfactorily and simultaneously solve both exposed problems, regarding the sonotrode cooling, or the correct positioning of parts in the welding zones to avoid gaps or grooves being left between them.

DESCRIPTION OF THE INVENTION

The ultrasonic welding device that is the object of the invention, comprised of a sonotrode, an ultrasonic converter and a booster, suitable for attachment to a handler or robotic arm, and to which a holder for cooling down is attached, with characteristics suited to resolving the problems exposed, in particular, to apply a frontal pressure on the parts to be welded, in a peripheral zone very close to the welding spot, in order to eliminate the unwanted gap between the parts; and to effectively cool the sonotrode, by its outer surface, guaranteeing the circulation of pressurized air toward the welding zone during the performance of the weld.

For this purpose, and according to the invention, this device is comprised of an outer sleeve arranged around the sonotrode and which delimits, along with the sonotrode, an annular chamber section for the circulation of pressurized air which is connected, through an internal cavity of the head, to an inlet of pressurized air, and which has an annular crenellated opening above, for the outlet of pressurized air and the peripheral cooling of the sonotrode.

Said outer sleeve has a rear portion mounted on the unit head with the possibility for axial movement between: —a forward position in which the sleeve's front end protrudes frontally regarding the tip of the sonotrode; making up a holder which exerts a configurable pressure, by means of compressible means, against the parts to be welded, in a peripheral area close to the welding point, during the approach of the sonotrode to the parts to be welded and before the tip of the sonotrode establishes contact with the parts to be welded, and —a backward position, determined by the advance movement of the sonotrode during the welding operation while the sleeve front end continues pressing the parts to be welded, and in this backward position the sleeve front end is positioned in a coplanar manner, or in a very close plane, to the sonotrode tip.

With these characteristics, it allows the front end of the sleeve to exert a configurable pressure on the parts to be welded, in a peripheral area close to the welding zone, before welding begins and throughout the welding process, so the correct positioning of the parts remains guaranteed, preventing grooves or undesired gaps between them.

The invention also allows the pressurized air to be used for the external cooling of the sonotrode, to circulate through the annular chamber and go out through the front opening of the sleeve, even during the welding operation, due to the crenellated configuration of the front opening of the sleeve which prevents the molten plastic from blocking the exit of the compressed air, contrary to what happens in the aforementioned antecedents that provide an exit through a central bore defined in the sonotrode itself.

The pressurized cooling air provides an additional beneficial effect on the performance on this kind of welding: when the sonotrode is removed after the weld, that compressed air cools down the molten plastic on the weld point, causing the solidification of the molten material, allowing the sonotrode to be removed without pulling on the molten material and, therefore, without deforming and/or weakening the weld, which prevents having to dedicate the time that is usually dedicated to waiting for the molten plastic to solidify—without refrigeration—in order to be able to remove the sonotrode without the troublesome deformations of the weld. The result of this effect is that welds are carried out at shorter intervals; meaning with higher throughput per unit.

Furthermore, the pressure exerted on the parts remains effective in the backward motion of the sonotrode, thereby preventing separation while cooling the weld with the pressurized air.

An additional advantage of circulating pressurized air through the inner cavity of the device is that the air pressure itself causes a self-centring effect in the radial direction of the sleeve with regard to the mechanical guiding element, thus minimizing wear by mechanical friction between them, since it only acts in the event of extreme radial forces.

DESCRIPTION OF THE FIGURES

In order to complement the description being made, and in order to facilitate the comprehension of the characteristics of the invention, a set of drawings is attached to this specification in which, in an illustrative and non-limiting nature, the following has been represented.

PREFERRED IMPLEMENTATION OF THE INVENTION

Figure 1:
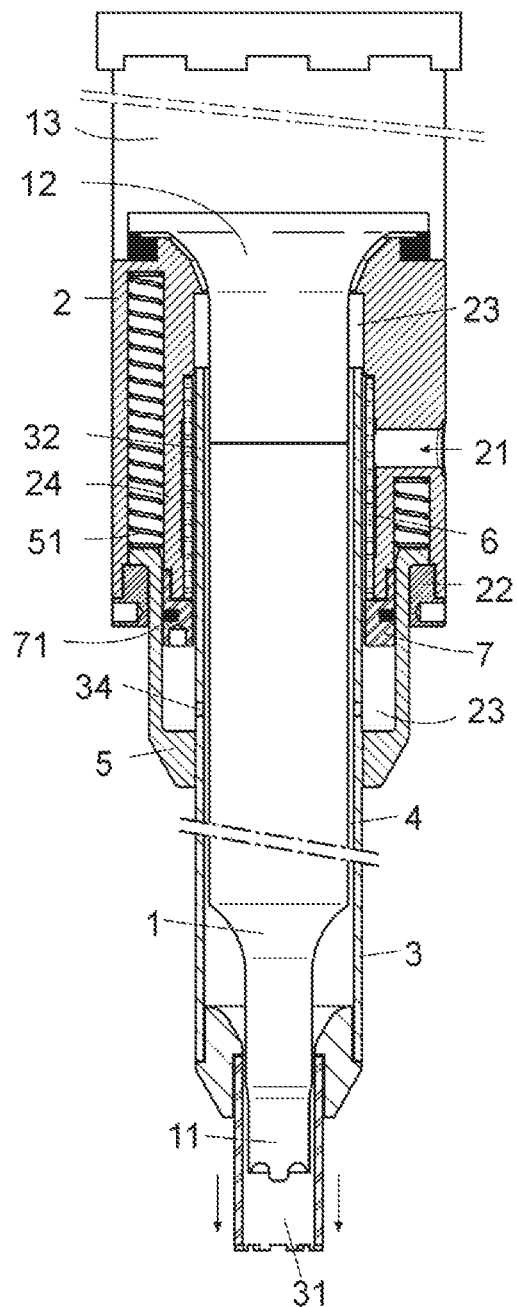
FIG. 1 shows an elevated cross-section view of an example of the implementation of the ultrasonic welding device according to the invention, in an inoperative position and in which the sleeve can be seen in the forward position.
Figure 2:
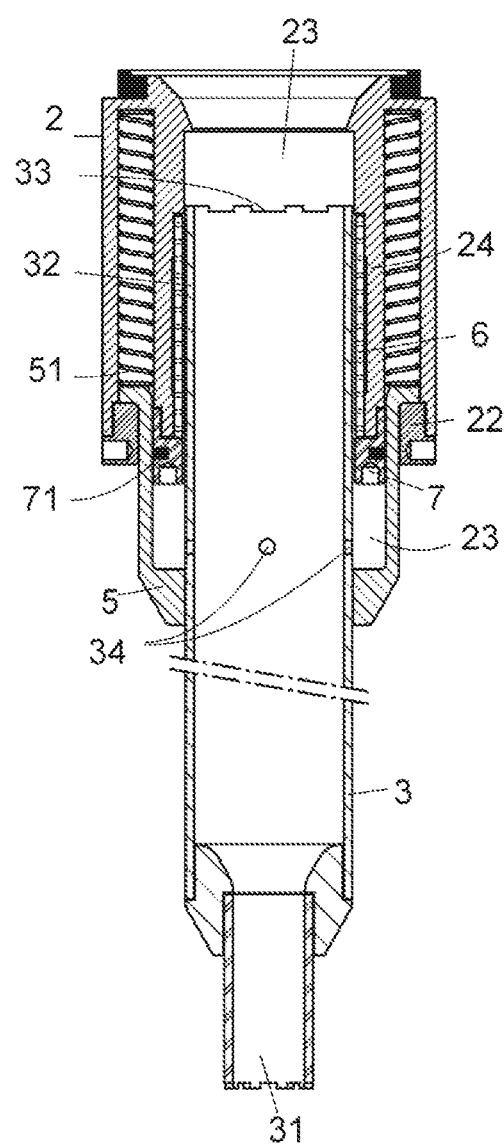
FIG. 2 shows the pushing and cooling head in a view similar to the previous one in which the ultrasonic welding elements have been removed.
Figure 3:
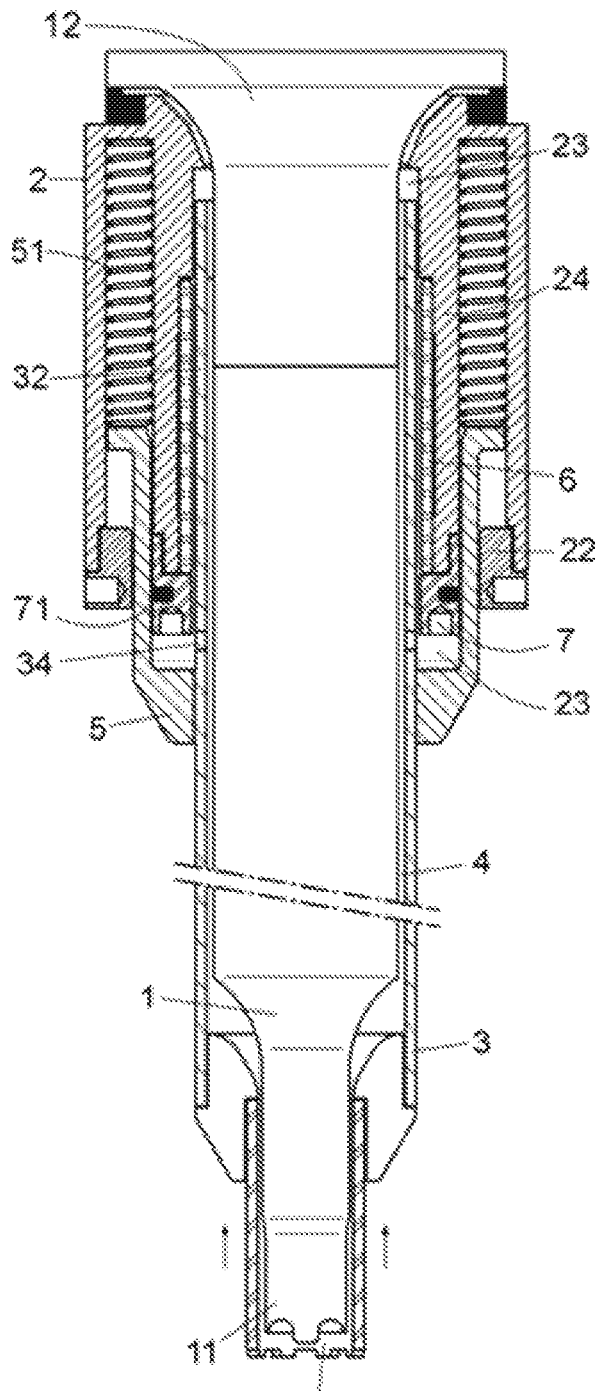
FIG. 3 shows an elevated cross-section view of the ultrasonic welding device of FIG. 1 in an operating position, with the sleeve in a backward position.

The ultrasonic welding device shown on FIGS. 1 and 3, as an example of the implementation, is comprised of a sonotrode (1) attached by its rear area to a booster (12) and this in turn to a converter (13) suitable for its connection to an actuator, handler or robotic arm responsible for its movement, and to which the head (2) is attached.

The device is comprised of an outer sleeve (3) arranged around the sonotrode (1) and which delimits, along with the sonotrode, an annular chamber (4) for the circulation of pressurized air connected through the cavity (23) to an inlet (21) of pressurized air defined in the head (2); providing the outer sleeve (3) at its front end (31) with a crenellated mouth for the exit of pressurized air at the periphery of the tip (11) of the sonotrode (1) and the peripheral cooling of this sonotrode (1).

The outer sleeve (3) has a rear portion (32) assembled in the head (2) with possibility for axial movement, between a forward position shown in FIG. 1, and a backward position shown in the FIG. 3.

In the forward position of the sleeve (3) the front end (31) protrudes frontally regarding the tip (11) of the sonotrode (1), whereas in the backward position the front end (31) of the sleeve is provided in a coplanar manner or in a plane close to the tip (11) of the sonotrode (1).

The device is comprised of a support (5) attached externally to an intermediate area of the sleeve (3) and it moves along with this sleeve (3) with regard to the head (2), between the aforementioned forward and backward positions.

The device is comprised of compressible means (51) represented in this example by some helical springs which act on the support (5) and tend to hold it in the forward position, in contact with a mechanical stop (22) fixed to the head (2) and which limits the advance of the support (5) in the forward position, as shown in FIG. 1.

The rear portion (32) of the outer sleeve (3) is housed in the chamber (23) of the head (2) which is conveyed through a perforated cylindrical bushing (6) with the lateral pressurized air inlet (21) defined in the aforementioned head (2); this rear portion of the sleeve (32) is comprised of a crenellated back (33) and some radial bores (34) for the passage of pressurized air from the chamber (23) of the head (2) toward the annular chamber (4) defined between the external sleeve (3) and the sonotrode (1), regardless the more or less advanced position of the this outer sleeve (3).

The perforated cylindrical bushing (6) is housed in a peripheral seat (24) defined in the chamber (23) of the head (2) and fixed in this peripheral seat (24) by means of a retainer (7) fixed to the head (2) which has a gasket (71) that acts against the movable support (5) preventing pressurized air from leaking through the space between the support (5) and the head (2).

Figure 4:
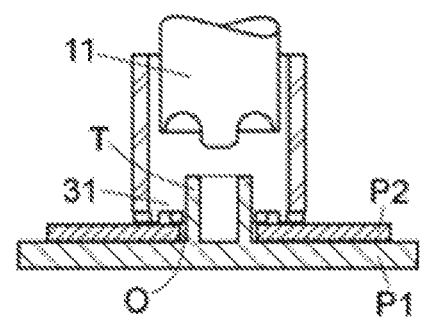
FIGS. 4 and 5 show both details of a front portion of the invented device in different phases of the welding process of two pieces of plastic material.
Figure 5:
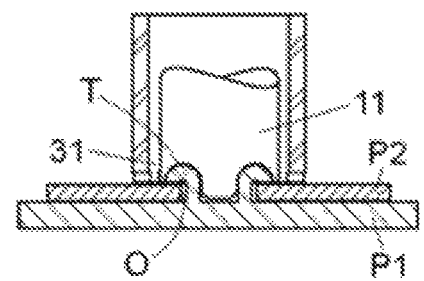

FIGS. 4 and 5 represent two positions of the device during operation in an axial direction and the welding of two plastic parts (P1, P2) conveniently superimposed and provided respectively with a stud (T) and a bore (O) for the passage of the stud (T).

As shown on FIG. 4, during the approach of the sonotrode (1) to the parts (P1, P2) to be welded, before the tip (11) of the sonotrode (1) establishes contact with the parts to be welded, the sleeve (3) is positioned protruding forward and its front end (31) forms a pusher that exerts, through the action of the compressible means (51), a configurable pressure against the parts (P1, P2) to be welded, in a peripheral zone close to the weld, immobilizing them in the suitable position and preventing any gap or groove from remaining between them.

As shown in FIG. 5, the sonotrode tip (11) acts against the stud (T) during the forward movement of the device in an axial direction, performing the weld; and the front end of the sleeve (31) held the parts to be welded (P1, P2) pressed together, reaching a backward position, precisely determined by this forward movement of the sonotrode (1).

The sleeve (3) moves back with regard to the sonotrode (1) during the welding, causing the compression of the compressible means (51) which tend to maintain it in the former position.

Once the nature of the invention has been sufficiently described, along with an example of its preferred implementation, it should be stated to the appropriate effects that the materials, shape, size and arrangement of the described elements may be modified, provided that this does not imply an alteration of the essential characteristics of the invention which are claimed below.

The invention claimed is:

1. Ultrasonic welding device; comprised of a sonotrode (1) attached by the back side to a booster (12) and in turn to a converter (13) suitable for connection to an actuator, handler or robotic arm responsible for its movement, and to which the head (2) is attached; is characterized by being comprised of: an outer sleeve (3) arranged around the sonotrode (1) and which delimits, along with that sonotrode (1) an annular chamber (4) for the circulation of pressurized air connected through the chamber (23) to a pressurized air inlet port (21) and which has a crenellated back end (31), for the outlet of pressurized air and the peripheral refrigeration of the sonotrode (1); the aforementioned outer sleeve (3) has a rear portion (32) assembled in the head (2) with the possibility of axial displacement, between: —a forward position in which the front end (31) of the outer sleeve (3) stands out frontally with regard to the tip (11) of the sonotrode (1); forming a pusher that exerts, through the action of some compressible means (51), a configurable pressure against the parts (P1, P2) to be welded, in a peripheral zone close to the weld, while approaching the sonotrode (1) to the parts to be welded and before the tip (11) of the sonotrode (1) makes contact with the aforementioned parts to be welded, and —a backward position, determined by the advance of the sonotrode (1) during welding while the front end (31) of the outer sleeve (3) keeps the parts (P1, P2) to be welded pressed together, and in which backward position the front end (31) of the outer sleeve (3) is arranged in a coplanar manner, or in a very close plane, to the tip (11) of the sonotrode (1).

2. The device, according to claim 1, is characterized by the rear portion (32) of the outer sleeve (3) which is housed in a chamber (23) of the head (2) which is conveyed through a perforated cylindrical bushing (6) with the lateral pressurized air inlet (21) defined in the aforementioned head (2); this rear portion (32) of the outer sleeve (3) is comprised of a crenellated back (33) and some radial bores (34) for the passage of pressurized air from the chamber (23) of the head (2) toward the annular chamber (4) defined between the external sleeve (3) and the sonotrode (1).

3. The device, according to claim 2, is characterized by the cylindrical perforated bushing (6) which is housed in a peripheral seat (24) defined in the chamber (23) of the head (2) and which is attached to this seat by means of a retainer (7).

4. The device, according to claim 3, is characterized by the retainer (7) that contains a sealing gasket (71) which acts against the sliding support (5), preventing outside leaks of pressurized air through the space between the support (5) and the head (2).

5. The device, according to claim 1, is characterized by being comprised of: a support (5) attached externally to an intermediate zone of the outer sleeve (3) and which moves along with the aforementioned outer sleeve (3), between the forward and backward positions; some compressible means (51) that act on the head (2) and tend to hold it in the forward position, and a mechanical stop (22) that delimits the advance of the support (5) in the forward position.

\* \* \* \* \*